United States Patent
Lee

(10) Patent No.: US 12,489,105 B2
(45) Date of Patent: Dec. 2, 2025

(54) DEVICE FOR REMOVING SCRAPS AFTER LASER NOTIFICATION OF FILM FORMING UNIT OF SECONDARY BATTERY FOR ELECTRIC VEHICLE

(71) Applicant: Kye-seol Lee, Seoul (KR)

(72) Inventor: Kye-seol Lee, Seoul (KR)

( * ) Notice: Subject to any disclaimer, the term of this patent is extended or adjusted under 35 U.S.C. 154(b) by 710 days.

(21) Appl. No.: 17/846,869

(22) Filed: Jun. 22, 2022

(65) Prior Publication Data

US 2023/0387378 A1    Nov. 30, 2023

(30) Foreign Application Priority Data

May 30, 2022    (KR) .................. 10-2022-0065958

(51) Int. Cl.

| | |
|---|---|
| *H01M 4/04* | (2006.01) |
| *B23K 26/08* | (2014.01) |
| *B23K 26/142* | (2014.01) |
| *B23K 26/38* | (2014.01) |
| *H01M 10/04* | (2006.01) |

(52) U.S. Cl.
CPC ......... *H01M 4/0471* (2013.01); *B23K 26/142* (2015.10); *H01M 10/0409* (2013.01); *B23K 26/0846* (2013.01); *B23K 26/38* (2013.01); *H01M 2220/20* (2013.01)

(58) Field of Classification Search
CPC .. B23K 26/0846; B23K 26/142; B23K 26/38; B24B 37/30; H01M 10/0409; H01M 2220/20; H01M 4/04; H01M 4/0471; H01M 10/04; Y02E 60/10; B65H 54/88; B65H 2301/4481; B65H 2301/51533; B65H 73/00
See application file for complete search history.

(56) References Cited

U.S. PATENT DOCUMENTS 5,250,784 A * 10/1993 Muller ................. B23K 26/123
219/121.72

FOREIGN PATENT DOCUMENTS

| CN | 219058496 U | * | 5/2023 |
|---|---|---|---|
| KR | 101604052 B1 | | 3/2016 |
| KR | 101802297 B1 | | 11/2017 |

* cited by examiner

*Primary Examiner* — Edward F Landrum
*Assistant Examiner* — Adam M Eckardt
(74) *Attorney, Agent, or Firm* — STIP Law Group, LLC

(57) ABSTRACT

The present invention relates to a device for removing scraps after laser notching of a film forming unit of a secondary battery for an electric vehicle, and to completing a jelly roll in which flags are not overlapped by clearly removing particles generated during notching jointly with accurately separating and discharging a scram part by ultraprecision injection through multiple air nozzles when forming a flag shape by notching an uncoated part without coating of a cathode and an anode in a trapezoidal shape by a laser in a secondary battery for an electric vehicle configured by stacking an electrode roll in a circular box.

The present invention is configured to include a winding unit 1 and rollers 2 to 4 unrolling and transporting a rolled electrode, a laser notching unit 5 making a flag shape by notching to an uncoated portion of the electrode transported through the roller 4, an air nozzle unit 7 for separating discharging a scrap 10 by injecting air to the uncoated portion of the electrode notched by the laser notching unit 5, and a collection unit 8 for strongly suctioning and discharging the scrap separated and discharged by the air nozzle unit 7 by air.

4 Claims, 4 Drawing Sheets

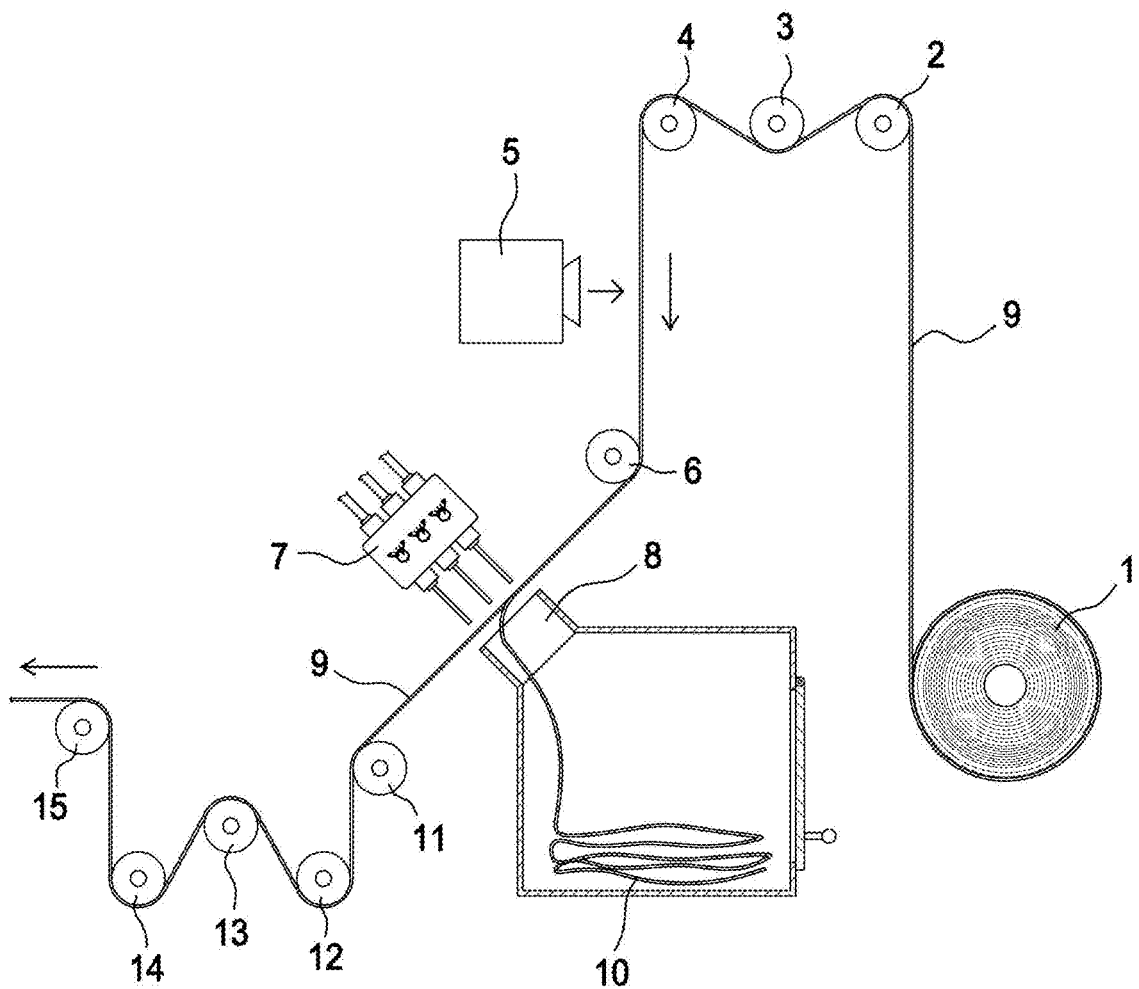
[FIG. 1]

[FIG. 2]
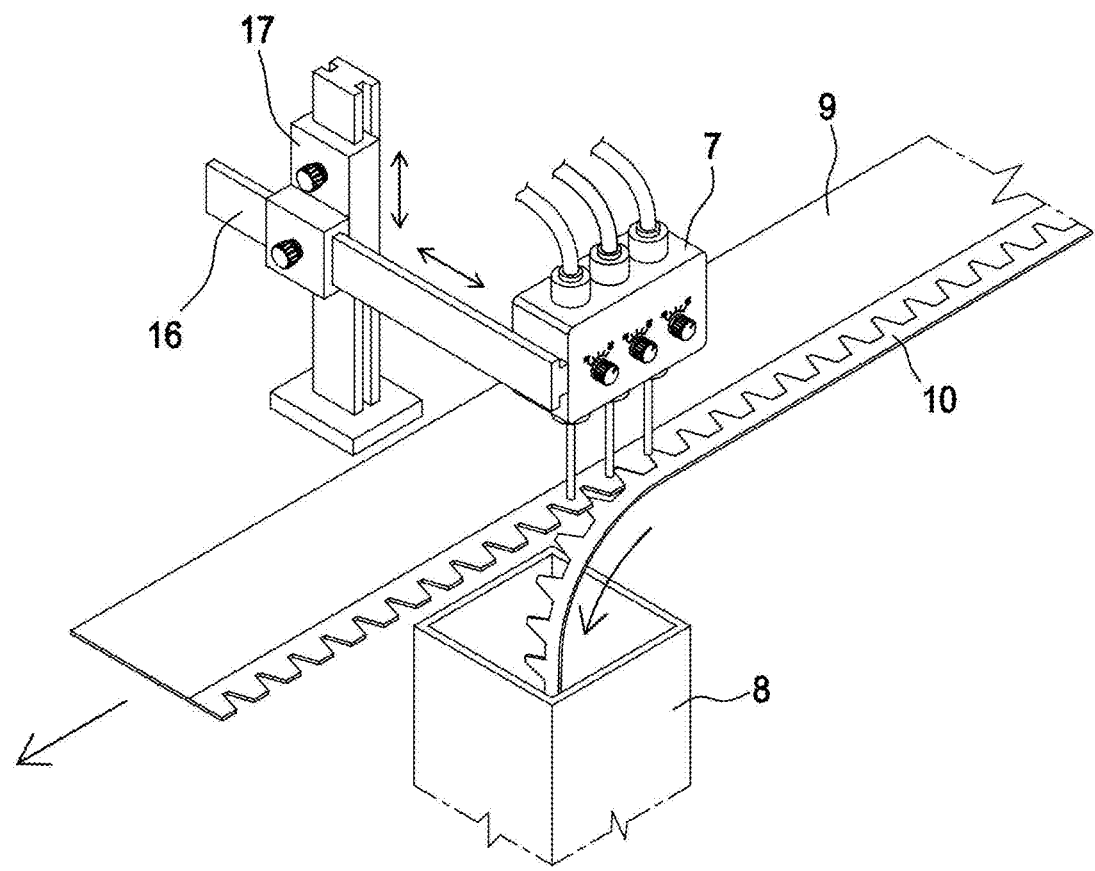

[FIG. 3]
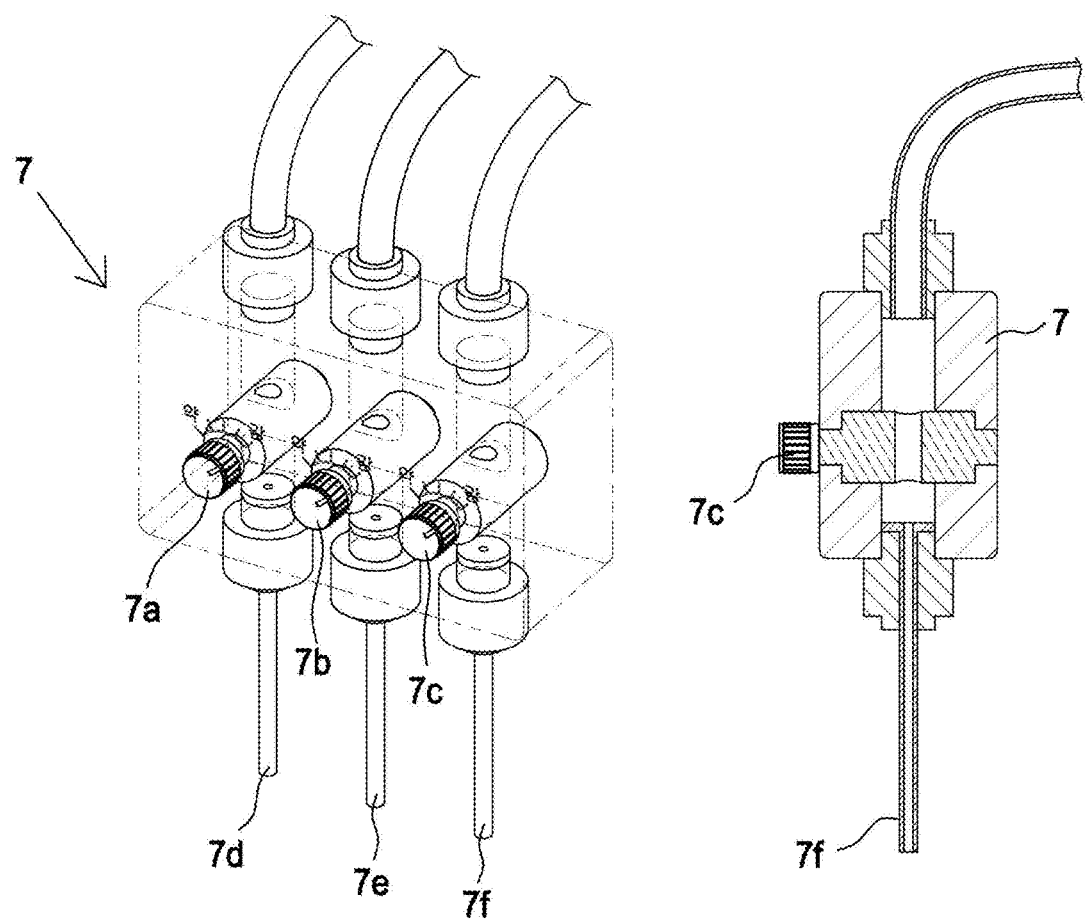

[FIG. 4A]
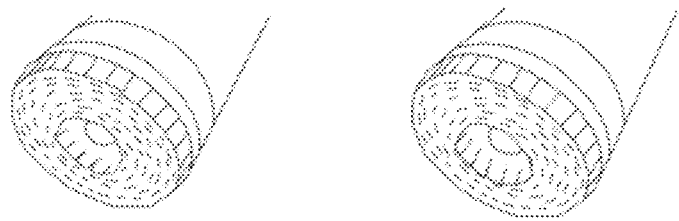
[FIG. 4B]
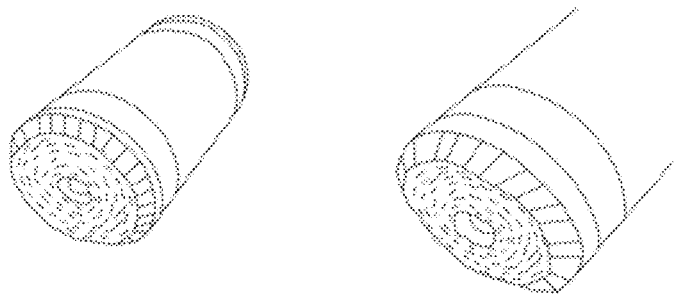
[FIG. 5]
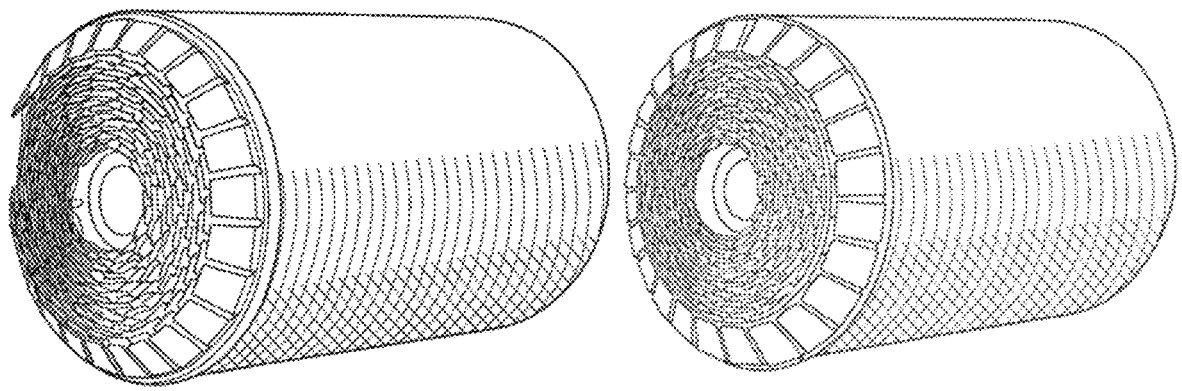

DEVICE FOR REMOVING SCRAPS AFTER LASER NOTIFICATION OF FILM FORMING UNIT OF SECONDARY BATTERY FOR ELECTRIC VEHICLE

CROSS-REFERENCE TO RELATED APPLICATIONS

This application claims the priority of the Korean Patent Applications NO 10-2022-0065958 filed on May 30, 2022, in the Korean Intellectual Property Office, the disclosure of which is incorporated herein by reference.

TECHNICAL FIELD

The present invention relates to a device for removing scraps after laser notching of a film forming unit of a secondary battery for an electric vehicle, and particularly, to completing a jelly roll in which flags are not overlapped by clearly removing particles generated during notching jointly with accurately separating and discharging a scram part by ultraprecision injection through multiple air nozzles when forming a flag shape by notching an uncoated part without coating of a negative electrode and a positive electrode in a trapezoidal shape by a laser in a secondary battery for an electric vehicle configured by stacking an electrode roll in a circular box.

BACKGROUND ART

In general, lithium-ion batteries have been so large that the reactivity of the lithium is not commercialized due to stability problems, but it has recently begun to be commercialized. Since these lithium-ion batteries are lighter than other batteries, the energy density and electromotive force are large, and there is no memory effect, and as a result, the lithium-ion battery is chargeable even a state in which the lithium ion battery is not completely discharged, but is charged at any degree and power loss by self-discharge is very low.

A lithium ion secondary battery having such an advantage is a high-voltage battery having stability because the lithium ion secondary battery can be quickly charged by an inflow reaction of lithium ions in which a charge reaction of a negative electrode is comparatively quickly made, and a state of the lithium ion is also present, and is primary adopted in a portable electronic device such as a cellular phone or a notebook computer in that a charging capacity is large and miniaturization is possible, and has been recently used in a battery of an electric vehicle.

The lithium ion secondary battery is completed by applying positive and negative active materials to a metal foil to produce the positive electrode and the negative electrode, inputting and rolling a separator between the positive electrode and the negative electrode to produce a jelly roll, and inserting the jelly roll (electrode roll) into a cylindrical or angular metallic container, and filling the container with an electrolyte, and sealing the container.

Here, the jelly roll is completed while a negative electrode plate is first rolled, the separator is rolled thereon, and a positive electrode plate is rolled on the separator, and the positive electrode covers the negative electrode between the separators at a top portion, and the separator is positioned on the surface and finally finished.

A secondary battery used for the electric vehicle is a chemical battery which is repeatedly charged and discharged by using a reversible transformation of chemical energy and electric energy, and high-performance secondary batteries include a Ni-MH secondary battery and a lithium secondary battery, and the lithium secondary batteries include a lithium metal secondary battery, a lithium ion secondary battery (angular, cylindrical, and pouch type), a lithium ion polymer secondary battery, a lithium ion polymer secondary battery, etc.

In recent years, as the electric vehicle has been commercialized, with the development of a large lithium secondary battery for the electric vehicle, research into an automation facility for mass production thereof has been actively conducted.

Among the lithium ion secondary batteries, in particular, in the case of the pouch type battery, transformation of a shape is easy, manufacturing cost is low, and weight is small, and as a result, there is a trend that the demand for the pouch type battery increases.

An electrode assembly is manufactured in a form in which an active material is applied to a part of an electrode film for forming the electrode assembly, and the active material is not applied to the remaining part but an electrode body is exposed.

An exposure portion at which the electrode body is exposed is processed to act as an electrode terminal for connecting the positive electrode and the negative electrode to the outside, and the electrode film is processed to be formed by applying the active material onto a thin-film conductor constituting the electrode body and not distinguished so that the processing is possible.

In the related art, a notching apparatus using punching is primarily used, but in recent years, damage to the electrode is more minor than the punching and the use of the notching apparatus using a laser capable of efficient production is increased, and the notching apparatus forms a terminal unit by partially cutting the exposure portion of the electrode film and a coated portion to which the active material is applied in the trapezoidal with the laser.

However, in the related art, when the exposure portion of the electrode film and the coated portion to which the active material is applied are partially cut in the trapezoidal shape with the laser, the flag is folded inward and sealed while the scrap cut with the laser is not separated and discharged, but attached as it is to complete a cylindrical jelly roll, so the scrap is not separated but overlapped with the flag portion and a volume increases, and fine dust is generated in a laser processing portion, which may lead to a poor product.

DOCUMENTS OF RELATED ART

Patent Documents (Patent Document 1) Korean Patent Registration No. 10-1802297
(Patent Document 2) Korean Patent Registration No. 10-1604052

DISCLOSURE

Technical Problem

The present invention is to solve the problem in the related art, and an object of the present invention is to provide a device for removing scraps after laser notching of a film forming unit of a secondary battery for an electric vehicle in which when a flag shape is made by notching an uncoated portion without coating of a negative electrode and a positive electrode with a laser, a notching form is entangled and not separated when the scraps are discharged due to a trapezoidal shape and scrap parts which are sent jointly are cleanly separated and discharged by ultraprecision injection through multiple air nozzles and a flag is not overlapped when an uncoated portion flag is wound thereby shortening a volume.

Another object of the present invention is to provide a device for removing scraps after laser notching of a film-forming unit of a secondary battery for an electric vehicle. This device is capable of enhancing the quality of a product by efficiently removing even fine particles generated by laser processing when scraps are separated and discharged through the air nozzle.

Technical Solution

In order to achieve the object, the present invention is configured to include: a winding unit and rollers unrolling and transporting a rolled electrode; a laser notching unit making a flag shape by notching to an uncoated portion of the electrode transported through the roller; an air nozzle unit for separating discharging a scrap by injecting air to the uncoated portion of the electrode notched by the laser notching unit; and a collection unit for strongly suctioning the scrap separated and discharged by the air nozzle unit by air suction.

The air nozzle unit has multiple air nozzles of 0.2 Φ, 0.4 Φ, and 0.6 Φ, and is set the air injection of the front end.

The air nozzle unit is configured to have multiple knobs for adjusting the intensity and the pressure of the air to set the intensity and the pressure of the air by adjusting the knob.

The air nozzle unit is configured to have a horizontal movement unit and a vertical movement unit for horizontal or vertical movement integrally installed therein, and automatically move by manual adjustment or by a motor, an air cylinder, or a solenoid.

Advantageous Effects

As described above, according to the present invention, there is an effect that uncoated portions without coating of a negative electrode and a positive electrode are notched by a laser, and then, scraps can be accurately separated and discharged through an air nozzle.

According to the present invention, there is an effect that fine dust generated during laser cutting can also be cleaned up through the air nozzle.

According to the present invention, since the scraps can be separated and removed and a flag formed, the volume of a jelly roll can be reduced.

DESCRIPTION OF DRAWINGS

FIG. 1 is a diagram for describing the overall operation state of the present invention.

FIG. 2 is a perspective view illustrating a state in which scraps are separated and discharged by an air nozzle after laser notching of a device for removing scraps after laser notching of a secondary battery for an electric vehicle according to the present invention.

FIG. 3 is a perspective view and a cross-sectional view of an air nozzle unit according to the present invention.

FIG. 4A, FIG. 4B, and FIG. 5 illustrate a secondary battery that does not perform scrap air separation and a secondary battery that performs scrap air separation.

MODES FOR THE INVENTION

Hereinafter, an embodiment of the present invention will be described below in detail with reference to the accompanying drawings.

FIG. 1 is a diagram for describing an overall operation state of the present invention, FIG. 2 is a perspective view illustrating a state in which scraps are separated and discharged by an air nozzle after laser notching of a device for removing scraps after laser notching of a secondary battery for an electric vehicle according to the present invention, and FIG. 3 is a perspective view and a cross-sectional view of an air nozzle unit according to the present invention, and the air nozzle unit is constituted by a winding unit 1 and rollers 2 to 4 unrolling and transporting a rolled electrode, a laser notching unit 5 making a flag shape by notching to an uncoated portion of the electrode transported through the roller 4, an air nozzle unit 7 for separating discharging a scrap 10 by injecting air to the uncoated portion of the electrode notched by the laser notching unit 5, and a collection unit 8 for collecting and discharging the scrap 10 separated and discharged by the air nozzle unit 7 by an air suction.

However, the collection unit 8 is set to strongly suction and discharge the scrap by the air suction.

The air nozzle unit 7 is configured to have multiple air nozzles 7d, 7e, and 7f of 0.2 Φ, 0.4 Φ, and 0.6 Φ, and to inject air with different intensities, and is configured so that the air injection degree of the front end is weakest and subsequently stronger.

Knobs 7a, 7b, and 7c for adjusting the intensity and pressure of the air is provided in the air nozzle unit 7, and as a result, the intensity and the pressure of the air may be arbitrarily set by adjusting the knobs.

The air nozzle unit 7 has a horizontal movement unit 16 and a vertical movement unit 17 for left-right or up-down movement integrally installed therein. The horizontal movement unit 16 and the vertical movement unit 17 may be manually adjusted and automatically move a motor, an air cylinder, or a solenoid.

An action of the present invention configured as such will be described.

In general, in a circular secondary battery for the electric vehicle, a flag shape is made and folded by processing uncoated portions without coating of a negative electrode and a positive electrode with a laser, and a terminal is welded thereon to make a battery and form the flag before winding the secondary battery as such.

When a process for forming the flag is described, the electrode 9 unrolled and moved from the winding unit 1 moves through the rollers 2 to 4 and passes through the laser notching unit 5, and laser notching of the scrap 10 of the electrode 9 is performed, and in this case, a laser notching form have a trapezoidal shape, and the scraps may not be normally separated, and entangled and moved.

Accordingly, in the present invention, the scrap 10 is completely separated from the trapezoidal shape, which may be collected through the collection unit 8.

That is, in the present invention, air is injected into the scrap 10 of the electrode 9 notched by the laser notching unit 5 stepwise in weak-medium-strong steps to separate and discharge the scrap 10 while it is entangled.

To this end, multiple nozzles 7d, 7e, and 7f are provided in the air nozzle unit 7 of the present invention, as illustrated in FIGS. 2 and 3. The injection degrees of respective nozzles are set differently.

That is, the air nozzle unit is installed so that the injection degree of the nozzle located at the front end is weakest, and subsequently gradually stronger.

Accordingly, the scrap 10 is completely separated by the nozzles 7a, 7b, and 7c of the injection nozzle unit 7 to be discharged through the collection unit 8.

In this case, the nozzles 7a, 7b, and 7c may adjust the pressure, the location, and the height of the air to be injected ultra precisely, and the knobs 7a, 7b, and 7c are installed on a front surface of the air nozzle unit 7, and the pressure and the intensity of the air may be adjusted by adjusting the knobs.

Here, the nozzles 7a, 7b, and 7c are enabled to inject the air ultraprecise. Only when the air is accurately injected into a predetermined portion of the scrap 10 can it be efficiently completely separated.

Further, the air nozzle unit 7 is set so that the location is adjusted horizontally or vertically by the horizontal movement unit 16 and the vertical movement unit 17, and the horizontal movement unit 16 and the vertical movement unit 17 may be horizontally and vertically by the motor, the air cylinder, or the solenoid, and may be manually adjusted by a worker.

Meanwhile, the scrap 10 separated by the air nozzle unit 7 is suctioned to the collection unit 8 by the air suction to be separately discharged.

The above description just illustrates the technical spirit of the present invention and various changes, modifications, and substitutions can be made by those skilled in the art to which the present invention pertains without departing from an essential characteristic of the present invention.

Therefore, the exemplary embodiments and the accompanying drawings disclosed in the present invention are used to not limit but describe the technical spirit of the present invention and the scope of the technical spirit of the present invention is not limited by the exemplary embodiments and the accompanying drawings.

The protective scope of the present invention should be construed based on the following claims, and all the technical concepts in the equivalent scope thereof should be construed as falling within the scope of the present invention.

EXPLANATION OF REFERENCE NUMERALS AND SYMBOLS

1: Winding unit
2-4, 6, 11-15: Roller
5: Laser notching unit
7: Air nozzle unit
7a, 7b, 7c: Knob
7d, 7e, 7f: Nozzle
8: Collection unit
9: Electrode
10: Scrap

The invention claimed is:

1. A device for removing scraps after laser notching of an electrode film for a secondary battery for an electric vehicle, the device comprising:
a winding unit comprising a spool and a plurality of rollers configured to unroll and transport a rolled electrode along a feed path;
a laser notching unit comprising a laser configured to notch an uncoated portion of the electrode to form a flag shape;
an air nozzle unit comprising multiple nozzles having apertures of 0.2 mm, 0.4 mm, and 0.6 mm in diameter, respectively, configured to inject air at increasing pressures to separate and discharge scrap generated by the laser notching unit; and
a collection unit comprising a suction duct configured to strongly suction the separated scrap from the electrode.

2. The device of claim 1, wherein the multiple nozzles of the air nozzle unit are arranged such that air injection at the front end is set to be gradually stronger from weak to medium to strong.

3. The device of claim 1, wherein the air nozzle unit further comprises adjustable knobs configured to regulate the intensity and pressure of the air injected through each nozzle.

4. The device of claim 1, wherein the air nozzle unit includes a horizontal movement unit and a vertical movement unit enabling automated or manual adjustment via a motor, air cylinder, or solenoid.

* * * * *